United States Patent [19]

Le Davay

[11] Patent Number: 5,238,172
[45] Date of Patent: Aug. 24, 1993

[54] METHOD OF DETECTING SEALING FAULTS IN A PROTECTIVE TUBE FOR PROTECTING AN ELECTRICAL AND/OR OPTICAL CABLE, A CABLE, AND AN INSTALLATION FOR IMPLEMENTING THE METHOD

[75] Inventor: Louis Le Davay, Louveciennes, France

[73] Assignee: Alcatel Cable, Clichy, France

[21] Appl. No.: 867,357

[22] Filed: Apr. 13, 1992

[30] Foreign Application Priority Data

Apr. 19, 1991 [FR] France .............................. 91 04857

[51] Int. Cl.$^5$ ............................................ B23K 31/00
[52] U.S. Cl. ................................... 228/104; 228/148; 228/9; 228/17.5
[58] Field of Search ............... 228/103, 104, 119, 147, 228/148, 176, 9, 17.5, 18

[56] References Cited

U.S. PATENT DOCUMENTS

| | | |
|---|---|---|
| 3,260,786 | 7/1966 | Katzschner .................. 228/104 |
| 4,759,487 | 7/1988 | Karlinski .................... 228/17.5 |
| 4,852,790 | 8/1989 | Karlinski .................... 228/17.5 |
| 4,949,894 | 8/1990 | Winter et al. ............... 228/148 |
| 5,007,703 | 4/1991 | Hale et al. .................. 228/148 |

FOREIGN PATENT DOCUMENTS

| | | |
|---|---|---|
| 0023031 | 1/1981 | European Pat. Off. . |
| 0050495 | 4/1982 | European Pat. Off. . |
| 1152560 | 8/1963 | Fed. Rep. of Germany . |
| WO9101506 | 2/1991 | France . |

*Primary Examiner*—Samuel M. Heinrich
*Attorney, Agent, or Firm*—Sughrue, Mion, Zinn, Macpeak & Seas

[57] ABSTRACT

The method and the corresponding installation detect sealing faults in metal protective tubes for protecting cables having electrical and/or optical conductors, referred to as "protected components", embedded in a sealing material filling the tube. The method consists in priming said sealing material with a detectable "test" gas either prior to or during injection of said material into said tube in a first station for enclosing the protected components inside the tube, and in causing said tube, filled in this way and optionally heated, to advance continuously past a detector, or inside a detection chamber of a second station containing the detector, either directly after the tube has been filled or at a subsequent stage. Application: land or under-sea cables, in particular for monitoring fluid-tight protective microtubes for protecting optical fibers.

16 Claims, 1 Drawing Sheet

METHOD OF DETECTING SEALING FAULTS IN A PROTECTIVE TUBE FOR PROTECTING AN ELECTRICAL AND/OR OPTICAL CABLE, A CABLE, AND AN INSTALLATION FOR IMPLEMENTING THE METHOD

The present invention relates to cables. It relates more particularly to detecting sealing faults in protective tubes for protecting electrical cables or optical fibers and on electrical and/or optical cables, and the corresponding installations for performing such detection.

BACKGROUND OF THE INVENTION

Generally, such protective tubes are made of metal. They are used to protect optical fibers in optical cables, in particular under-sea cables, or metal wires which may be associated with one or more optical fibers, in particular in live cables or guard cables in overhead power transmission lines. The components protected in this way are embedded in a sealing material filling the tube.

Such tubes are extruded or are manufactured by longitudinally welding a strip shaped into a tube, the strip itself being corrugated or smooth.

Protective tubes for optical fibers may be tubes of small diameter, i.e. about 2.5 mm, and of thickness about 0.1 mm to 0.3 mm. They are then referred to as "microtubes". Generally, the optical fibers are inserted into the microtube while it is being manufactured, usually by its longitudinal edges being welded together by means of a laser torch, for example. The fibers are further embedded in the sealing material filling the microtube. The microtube is usually filled while the fibers are being enclosed therein.

In particular, Document U.S. Pat. No. 4,852,790 describes an installation for making a microtube around a fiber or a bundle of fibers, and for simultaneously filling said microtube with a sealing material as it is being made.

In that installation, a tube for injecting sealing material opens out into a microtube which is still slightly open and which is receiving the fiber(s). Said tube opens out downstream from the point at which the edges of the microtube are welded together. The fibers are pushed into place by an inert gas blown into a fiber guide tube.

Such protective tubes or microtubes are not always quite fluid-tight, and when they are obtained by welding, they sometimes have small pores at the welded edges.

Known means for detecting faults along very long metal tubes or wires use ultrasonic methods, or eddy currents. However, such methods remain ineffective when the products to be monitored are below a certain size, and therefore they cannot be applied to detecting faults in protective microtubes for optical fibers. Other techniques for detecting faults in tubes consist in injecting a test gas, in particular helium, into the tube to be monitored, and in detecting any traces of helium in the surrounding atmosphere. Those techniques are not suitable for very long tubes which are small in cross-sectional area, when such tubes are already filled with a sealing material which prevents the test gas from propagating under pressure along the tubes.

An object of the present invention is to provide sealing-fault detection for detecting sealing faults in protective tubes for electrical and/or optical cables, in which the protected components are already embedded in a gel-type sealing material which fills the tube, which detection is effective regardless of the size of the tubes and is therefore applicable both to protective tubes or microtubes for optical fibers and to protective tubes which are much larger in cross-sectional area, and which protect electrical cables or electrical and optical components.

SUMMARY OF THE INVENTION

The present invention therefore provides a method of detecting fluid-tightness of such tubes.

The method of the invention consists firstly in priming said sealing material with a detectable "test" gas in a first step, so as to fill said tube with the resulting "processed" sealing material primed with said test gas, and secondly in causing said tube filled with said processed sealing material to advance past a detection head for detecting said test gas in a second step.

This method may further have either of the following features:

the sealing material is heated, so as to improve diffusion thereof, before the tube is caused to advance through a detection chamber containing said detection head; and the fluid-tightness detection second step is performed continuously immediately after the tube-filling first step and on the same processing line, or is performed subsequently and on an independent other processing line, preferably in a detection chamber.

The present invention also provides an electrical and/or optical cable on which said method can be implemented.

The cable according to the invention has electrical conductors and/or optical fibers, referred to as "protected components", which are enclosed inside a protective tube filled with a sealing material, and the cable further has a test gas distributed throughout said sealing material filling said tube, over the length of the cable.

The present invention also provides and installation for implementing the method.

The installation according to the invention has a first station for enclosing said components inside a tube, and for filling said tube with sealing material, which station is coupled to sealing material feed and injection means, and at said first station, the installation includes a test gas storage cylinder coupled to said feed and injection means for supplying said processed material primed with test gas and injecting it into said tube, and in a second station separate from the first station, the installation includes said detection head which is responsive to said test gas and which is mounted in a detection chamber through which said tube filled with said processed material advances, and a control circuit coupled to said head so as to give corresponding instructions when a sealing fault is detected in said tube.

Said test gas cylinder may be connected to a sealing material tank belonging to said feed means, or may preferably be connected to a metering injection pump interposed on a pipe of said feed means, the end of which pipe is equipped with a hollow injection needle inserted into said tube.

Said second station may include heating means mounted upstream of said detection head, on the path along which said tube advances.

BRIEF DESCRIPTION OF THE DRAWING

An embodiment of the invention is described by way of example with reference to the accompanying drawing, in which.

DETAILED DESCRIPTION

Figure 1:
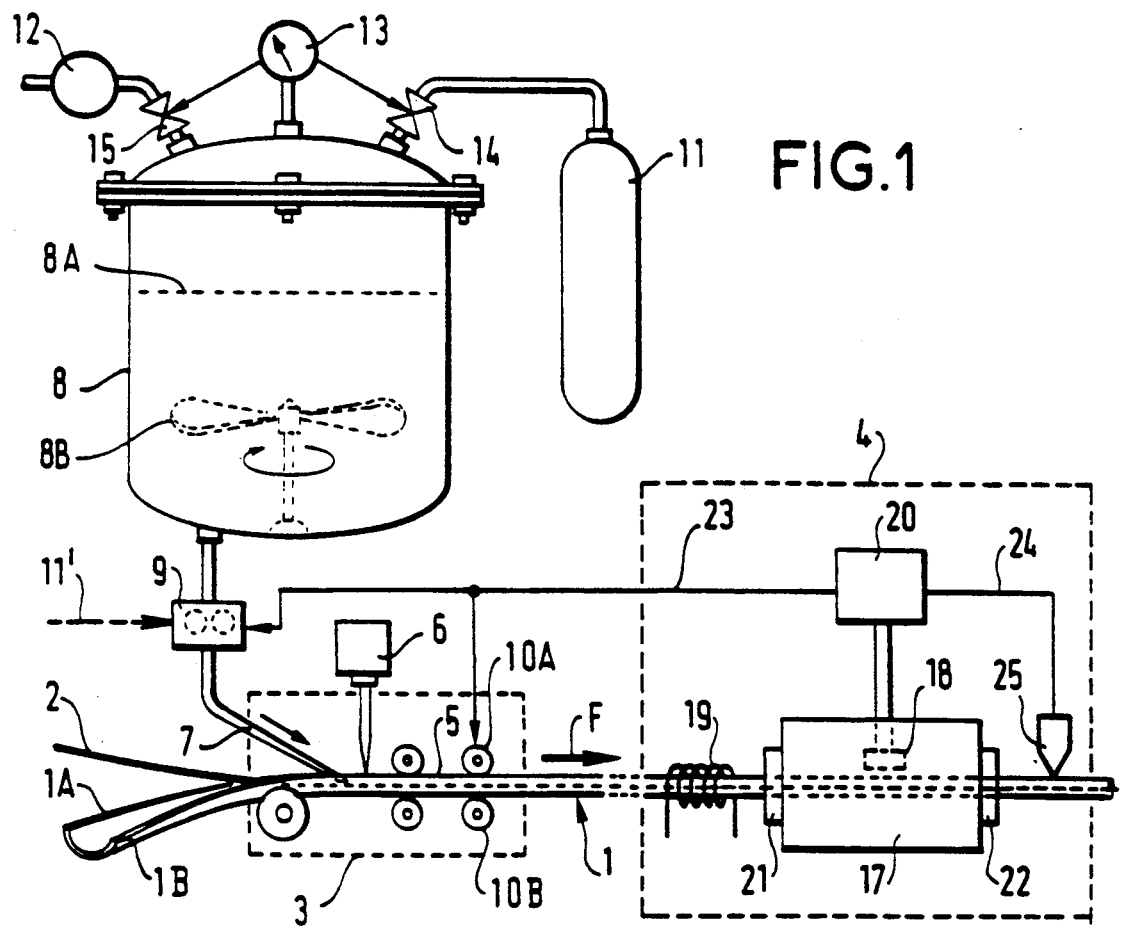
FIG. 1 is a diagram showing a welding and sealing-fault detection installation for welding and for detecting sealing faults in a protective microtube for optical fibers.
Figure 2:
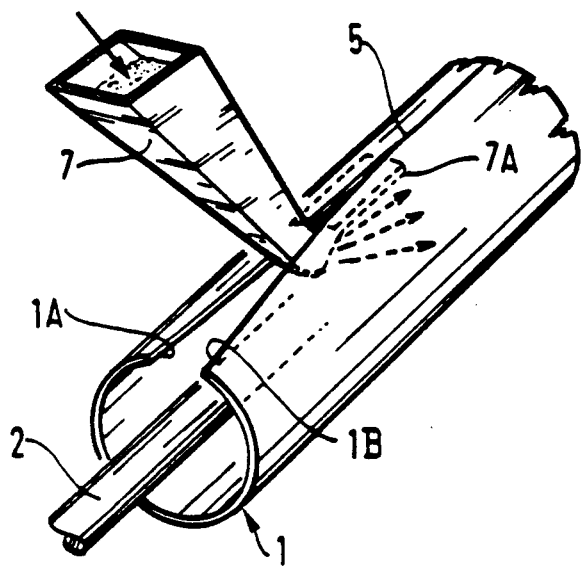
FIG. 2 shows a detail of the installation on an enlarged scale.

The FIG. 1 installation manufactures a microtube 1 directly around one or more optical fibers 2 and simultaneously fills the microtube with a sealing material in a station 3. The material is treated before or while being injected into the microtube so as to prime it with a detectable "test" gas. Any sealing faults in the microtube are detected continuously in a station 4, as the fibers are enclosed in the microtube, in the example shown.

The sealing-fault detection station 4 is downstream of station 3 and on the same line as it. The detection station 4 is merely at a sufficient distance from station 3 to avoid any of the test gas emanating directly therefrom.

In a variant, station 4 may be on another line independent from the line defined by station 3, thereby providing subsequent fault detection, e.g. during a re-welding operation while the microtube is being paid out from a storage paying-out device.

In this installation, station 3 is known per se. As shown, welding is performed by a laser torch 6 whose rays are focused by suitable optical means onto the weld line 5 defined by the edges 1A, 1B of the microtube advancing through the station. Station 3 receives the tube with its edges still slightly apart, and they are made to meet almost just before the point of impact of the laser rays. A hollow needle 7 for injecting the sealing material is inserted into the microtube before welding, and is coupled to a sealing material tank 8 via an injection pump 9 interposed between the hollow needle and the tank. The hollow needle 7 has a protective end spout 7A, or the end portion of the hollow needle extends beyond the point of welding, so as to prevent the edges from being soiled before they are welded together.

Bottom and top rollers, such as 10A and 10B guide the microtube and drive it through station 3 as shown by arrow F.

Station 3 may naturally be of another known type.

Beyond station 3, other rollers (not shown) guide and the closed microtube and drive it through station 4.

In the present invention, prior to being injected into the microtube, the sealing material may be degassed so as to remove the initial gases, an in particular the industrial air it contains, and is primed with a detectable "test" gas. For example, the sealing material may be a petroleum gel or any other analogous sealing compound. The detectable gas is chosen from the gases traditionally used for leak detecting, in particular helium which is very easily detected, and which does not cause any additional optical attenuation in the fibers in the example in question.

To this end, the tank 8 is initially not entirely full of sealing material, as shown by the level referenced 8A, is optionally equipped with heating means (not shown), and has its top coupled to a helium storage cylinder 11, to a vacuum pump 12, and to a pressure detector 13 for detecting the pressure inside the tank. The pressure detector 13 detects the desired pressure of the vacuum to be established and the desired helium pressure. Two valves 14 and 15, interposed on the pipes between the helium cylinder and the tank 8, and between the vacuum pump and the tank, are opened and closed by the detector 13 as a function of predefined reference values for the desired pressure of the vacuum to be established and the desired helium pressure. Inside the tank 8, there is optically an internal mixing system 8B for mixing the helium and the sealing material.

There may be two tanks so that, when either one of them is empty, it may be replaced by the other tank which also contains sealing material primed with the test gas prior to filling the microtube.

In a variant, the helium storage cylinder 11 is coupled to the injection pump 9 as shown by dashed arrow 11', instead of being coupled to the sealing material tank 8. The sealing material is then primed with helium as it is being injected into the microtube. The pump 9 then enables the helium to be uniformly distributed in the sealing material, and to be constantly injected in sufficient quantities therewith into the microtube.

The sealing-fault detector station 4 includes a detection chamber 17 containing a helium detection head 18, heating means 19 for heating the microtube and the sealing material contained therein before the microtube enters the chamber 17. A control circuit 20 outside the chamber is coupled to the detection head to provide suitable control in the event that helium is detected.

The detection head 18 is mounted close to the microtube, and facing the existing weld line. Two seals 21 and 22, one at the microtube input and one at the microtube output of the chamber 17, seal the chamber from the other portions of the equipment and from the surrounding outside atmosphere, so as to provide high sensitivity in detecting the presence of helium in the chamber.

The heating means 19 upstream of the chamber enable more helium to diffuse through any pores in the microtube.

Any traces of helium detected in the chamber necessarily mean that the microtube is not fluid-tight. Such traces cause suitable instructions to be given by the circuit 20. For example, the installation is stopped and/or the position of the microtube relative to the laser torch is adjusted, as shown by a first control link 23 between the circuit 20, the drive rollers such as 10A, and optionally the injection pump 9. With or without the installation being stopped, instructions may also be given to re-weld immediately, or merely to identify the faulty portion to be subsequently re-welded or removed, as shown be a second control link 24, between the circuit 20 and a re-welding or identification member 25, downstream of the chamber 17.

Each time traces of helium are detected in the detection chamber, the chamber is ventilated so as to remove said traces and the detector is reactivated. If the line operates continuously, the length of microtube advancing through the chamber during ventilation thereof is also considered to be faulty, and is subsequently checked.

The embodiment described above and shown in the drawing is given with reference to a protective microtube for optical fibers, which microtube is welded by a laser torch. Naturally, the welding method or the manufacturing method of the tube or microtube as such outside the invention may be different, as indicated above.

Fault detection, shown as being performed on the line on which the fibers are enclosed in the microtube, may also be performed during another independent step in which the microtube is processed as it is continuously advancing or may be repeated several times during a plurality of such steps, without going beyond the ambit of the invention. The same goes for the dimensions of the protective tube and for the cable components protected thereby, which components may be one or more metal conductors twisted together or not, in particular made of copper or of aluminum, which may be associated with one or more optical fibers, for live cables or guard cables on overhead transmission lines, and the same goes for the test gas used which may be a detectable gas other than helium, but remaining compatible with the protected components, since this method of detecting sealing faults in protective tubes is applicable to both land and under-sea cables, whether optical or otherwise.

I claim:

1. A method of detecting sealing faults in a metal protective tube for protecting an electrical and/or optical cable having electrical conductors and/or optical fibers constituting protected components, embedded in a sealing material filling said tube, said method comprising priming said sealing material with a detectable test gas in a first step, filling said tube with the resulting processed sealing material primed with said test gas in a second step, and advancing said tube filled with said processed sealing material past a detection head for detecting said test gas in a third step.

2. A method according to claim 1, comprising, before priming said material with said test gas, further comprising degassing said sealing material in a fourth step.

3. A method according to claim 2, wherein said step of degassing said material comprises heating said sealing material.

4. A method according to claim 1, wherein said detection head is placed inside a detection chamber, and said method further comprising a fifth step of heating said tube and the sealing material contained therein in the, before advancing said tube past said detection head to improve gas diffusion of said test gas.

5. A method according to claim 1, wherein said third step is performed continuously, directly after filling said tube with the processed sealing material over said protected components on a same processing line.

6. A method according to claim 1, wherein said third step is performed independently from the first and second steps, on a different processing line from the processing line used for said first and second steps.

7. An installation for detecting sealing faults in a metal protective tube for protecting an electrical and/or optical cable having electrical conductors and/or optical fibers constituting protected components, embedded in a sealing material filling said tube, said installation comprising a first station including means for enclosing said components inside a tube, means coupling said first station to feed and injection means for supplying said sealing material and injecting it into said tube at said first station, a test gas storage cylinder coupled to said feed and injection means for supplying said processed material and injecting it into said tube, a second station separate from said first station, a detection head at said second station for sensing said test gas and mounted in a detection chamber, means for advancing said tube filled with said processed material and said test gas through said detection chamber and proximate to said detection head, and a control circuit coupled to said detection head capable of providing instructions for said installation when a sealing fault is detected in said tube.

8. An installation according to claim 7, wherein said first and second stations constitute a same processing line with said second station downstream of said first station and continuously receiving said tube from said first station.

9. An installation according to claim 7, wherein said second station belongs to a processing line independent from the processing line defined by said first station.

10. An installation according to claim 9, wherein said second station further includes heating means mounted upstream of said detection head for heating said tube after exiting from said first station.

11. An installation according to claim 9, wherein said second station further includes a re-welding or identification member downstream of said chamber for re-welding or identifying a portion of tube that is detected as being faulty, and means for coupling said member to said control circuit.

12. An installation according to claim 9, in which said sealing material feed and injection means comprise a tank coupled via an injection pump to a hollow injection needle inserted into the tube at said first station, wherein said test gas storage cylinder is coupled to the top of said tank via quantity control means for controlling the quantity of test gas fed into said tank and mixed with said material.

13. An installation according to claim 12, wherein a vacuum pump is connected to the top of the tank for subjecting the interior of the tank to vacuum pressure, and wherein said control means comprise a pressure detection means for detecting vacuum pressure or test gas pressure inside said tank.

14. An installation according to claim 12, further including mixing means for mixing said test gas with said material, which mixing means are mounted inside said tank.

15. An installation according to claim 12, wherein heating means are associated with said tank, for degassing said sealing material of the initial gas contained therein.

16. An installation according to claim 9, wherein said feed and injection means include a feed pipe having at one end a hollow injection needle inserted into said tube, wherein said test gas cylinder is coupled directly to an injection pump interposed on said pipe and substantially between the test gas cylinder and said hollow injection needle, and priming material with said test gas continuously as the sealing material is injected into said tube, and wherein said pump is a metering and blending pump.

* * * * *